United States Patent
Bookstaber

(10) Patent No.: US 7,324,971 B2
(45) Date of Patent: Jan. 29, 2008

(54) BLIND PERTURBATION ENCRYPTION METHOD FOR PROTECTING FINANCIAL POSITION INFORMATION WHILE PROVIDING RISK TRANSPARENCY

(76) Inventor: Richard Bookstaber, 131 Riverside Dr., #2A, New York, NY (US) 10024

( * ) Notice: Subject to any disclaimer, the term of this patent is extended or adjusted under 35 U.S.C. 154(b) by 686 days.

(21) Appl. No.: 10/268,381

(22) Filed: Oct. 10, 2002

(65) Prior Publication Data

US 2003/0225706 A1    Dec. 4, 2003

Related U.S. Application Data

(60) Provisional application No. 60/385,800, filed on Jun. 4, 2002, provisional application No. 60/384,259, filed on May 29, 2002.

(51) Int. Cl.
*G06Q 40/00* (2006.01)

(52) U.S. Cl. ............................. 705/38; 705/35; 705/80

(58) Field of Classification Search ................. 705/38, 705/35, 80, 37; 455/450; 713/200; 712/241
See application file for complete search history.

(56) References Cited

U.S. PATENT DOCUMENTS

| | | | | |
|---|---|---|---|---|
| 5,892,900 A | * | 4/1999 | Ginter et al. ................. | 726/26 |
| 6,081,502 A | * | 6/2000 | Paneth et al. ................ | 370/210 |
| 6,212,629 B1 | * | 4/2001 | McFarland et al. ......... | 712/241 |
| 6,658,393 B1 | * | 12/2003 | Basch et al. ................... | 705/38 |
| 6,996,540 B1 | * | 2/2006 | May ............................. | 705/37 |
| 2002/0091975 A1 | * | 7/2002 | Redlich et al. ............. | 714/699 |
| 2003/0070077 A1 | * | 4/2003 | Redlich et al. ............. | 713/182 |
| 2005/0080720 A1 | * | 4/2005 | Betz et al. .................... | 705/38 |
| 2005/0091524 A1 | * | 4/2005 | Abe et al. .................... | 713/200 |
| 2006/0190383 A1 | * | 8/2006 | May ............................. | 705/37 |
| 2007/0011079 A1 | * | 1/2007 | May ............................. | 705/37 |
| 2007/0087756 A1 | * | 4/2007 | Hoffberg .................... | 455/450 |

FOREIGN PATENT DOCUMENTS

| | | | |
|---|---|---|---|
| CA | WO 96/06402 | * | 2/1996 |
| JP | 2005285013 A | * | 10/2005 |

* cited by examiner

*Primary Examiner*—Narayanswamy Subramanian
(74) *Attorney, Agent, or Firm*—Duane Morris LLP

(57) ABSTRACT

A method for protecting investment position information during risk or performance evaluation, comprising the steps of: sending position name information and corresponding position quantity information from a sender to a calculation agent by way of one or more intermediaries; and concealing at least a respective portion of the sent information from the calculation agent and each of the one or more intermediaries, such that none of the group consisting of the calculation agent and the one or more intermediaries has access to all of the group consisting of the identity of the sender, the position names, and the position quantities.

31 Claims, 6 Drawing Sheets

BLIND PERTURBATION ENCRYPTION METHOD FOR PROTECTING FINANCIAL POSITION INFORMATION WHILE PROVIDING RISK TRANSPARENCY

This application claims the benefit of U.S. Provisional Patent Application No. 60/384,259, filed May 29, 2002, and U.S. Provisional Patent Application No. 60/385,800, filed Jun. 4, 2002.

FIELD OF THE INVENTION

The present invention relates to the generation of risk and performance management information using privileged or sensitive data.

BACKGROUND OF THE INVENTION

Over the course of the past decade there has emerged a growing demand for risk transparency by the clients of investment firms as well as the regulators of those firms. This demand has been spurred by repeated crises in financial markets that have led to substantial losses. The most cited examples among hedge funds and other investment firms are the collapse of Long Term Capital Management (LTCM) in 1998, where clients lost well in excess of a billion dollars, and of Granite Partners in 1994, where clients lost over half a billion dollars. In both cases, the repercussions of the collapse were felt throughout the banking and investment banking community. Secondary losses due to the reduction in market liquidity and the loss in confidence in the fund's creditors were many times the losses of the investment firms responsible for the crises. Because of these secondary effects, as well as several well-publicized failures among investment banks and commercial banks, such as the mortgage and Treasury losses that led to the demise of Kidder Peabody in 1994, the same demand for risk transparency has been voiced toward the investment banks and commercial banks.

A number of regulatory authorities, including the Bank of International Settlement and the Federal Reserve, have demanded increasingly detailed risk reporting among the financial institutions that they regulate. Similar demands have come from quasi-regulatory bodies and professional groups in the investment and hedge fund community, as illustrated by the President's Report that followed the LTCM collapse, and the Investor Risk Committee of the International Association of Financial Engineers. Clients who invest in investment firms and hedge funds, the consultants who represent them and so-called "fund of funds" that invest on their behalf also have clamored for improved risk reporting in order to better gauge the potential for future crises.

There is broad agreement on the measures that are required for adequate risk management and reporting. These include measures, collectively known as "value at risk" of "VaR" measures, that provide an estimate of the probability of loss. These range from simple standard deviation estimates of portfolio returns to the construction of sophisticated, specialized return distributions that attempt to take into account the potential for jumps and related "fat tail" properties of security returns. Other analyses include stress tests that run the investment firm's portfolio through historical or prospective disaster scenarios. For example, the positions might be stressed by seeing the losses the positions would have experienced over the course of the 1987 market crash or the 1997 Asia crisis. Other risk analysis breaks portfolio positions into key risk factors, such as interest rate risk, oil-related risk, and credit risk. Yet other risk analysis uses a statistical analysis of position information to determine trading style factors, such as a tendency to follow trends or to focus on value-oriented stocks.

There are related measures that deal with performance. These measures usually combine risk measures with some measure of portfolio returns. For example, the Sharpe Ratio and the Information Ratio both measure performance by looking at the ratio of return to the standard deviation of return. For the purposes of the description and embodiments, my discussion of risk measures and risk analysis relates to both risk and performance. The inventor envisions application to any algorithm that employs position information, especially algorithms that have the property of homogeneity which will be discussed below.

There is also broad agreement that for the risk analysis to be of value for due diligence or fiduciary purposes, it should be run independent of the Investment Firm. That is, ideally the client or regulator would rather have their own agent or trusted third party do the risk analysis than rely on analysis provided by the Investment Firm itself.

These risk measures require the underlying positions of the Investment Firm as input. Each position will be affected differently by changes in market factors and will have a distinct reaction to economic events. And obviously a larger exposure or holding will lead to greater risk. Unfortunately, the need to use the underlying security positions to do risk computations creates conflicts between the demand for independent risk analysis and the demands that investment firms have for position confidentiality.

Position transparency raises a number of risks for the Investment Firm. One risk is that others will piggyback on their positions, both profiting from their analysis and diluting their trading opportunities. Another is that the methodology they employ for trading might be revealed by an analysis of their positions. And, most critically, knowledge of their positions might lead others to trade against them. This can be particularly costly when an Investment Firm has a large position, especially a large short position, where predatory activity in the market can create a short squeeze forcing the Investment Firm out of what might otherwise be a profitable position.

There is thus an increasing demand for a method to provide the position information in a way that allows the computation of risk information while keeping that position information confidential.

SUMMARY OF THE INVENTION

One aspect of the invention is a method for protecting investment position or transaction information during risk or performance evaluation, comprising the steps of: (a) providing information defining a set of investment positions or transactions of an Investment Firm, the information including position or transaction quantities; (b) encoding at least a portion of the information to conceal the position or transaction quantities of the investment positions or transactions from a Calculation Agent that performs risk or performance evaluation on the encoded position or transaction information; and (c) transmitting the encoded position or transaction information to the Calculation Agent.

Another aspect of the invention is a method for protecting investment position information during risk or performance evaluation, comprising the steps of: receiving information defining a set of investment positions or transactions from an Investment Firm, the information including position or transaction quantities; (b) encoding at least a portion of the position or transaction information to conceal the identity of the Investment Firm and the position or transaction quantities of the investment positions or transactions from a Calculation Agent that performs risk or performance evaluation on the encoded position or transaction information; and (c) transmitting the encoded position or transaction information to the Calculation Agent.

Another aspect of the invention is a method for protecting investment position information during risk or performance evaluation, comprising the steps of: (a) sending position name information and corresponding position quantity information from a sender to a Calculation Agent by way of one or more intermediaries; and (b) concealing at least a respective portion of the sent information from the Calculation Agent and each of the one or more intermediaries, such that none of the group consisting of the Calculation Agent and the one or more intermediaries has access to all of the group consisting of the identity of the sender, the position names, and the position quantities.

Another aspect of the invention is a method for protecting investment position information during risk or performance evaluation, comprising the steps of: (a) sending position name information and corresponding position quantity information from a sender to a Calculation Agent by way of an intermediary that encodes the position quantity information using a first transform that can be inverted based on the homogeneity of a risk or performance function that is applied to the position quantities by the Calculation Agent; and (b) receiving risk or performance information generated from the transformed position quantity information by the Calculation Agent.

Another aspect of the invention is a method for protecting investment position information during risk or performance evaluation, comprising the steps of: (a) receiving risk or performance information generated by a Calculation Agent based on encoded input information derived from a set of original position quantities; and (b) applying a transform to the risk or performance information received in step (a) to determine risk or performance associated with the original position quantities, the second transform being based on the homogeneity of a risk or performance function used by the Calculation Agent to generate the information received in step (a).

BRIEF DESCRIPTION OF THE DRAWINGS

FIG. 1A is a block diagram of a variation of the embodiment of FIG. 1.

OVERVIEW

Figure 1:
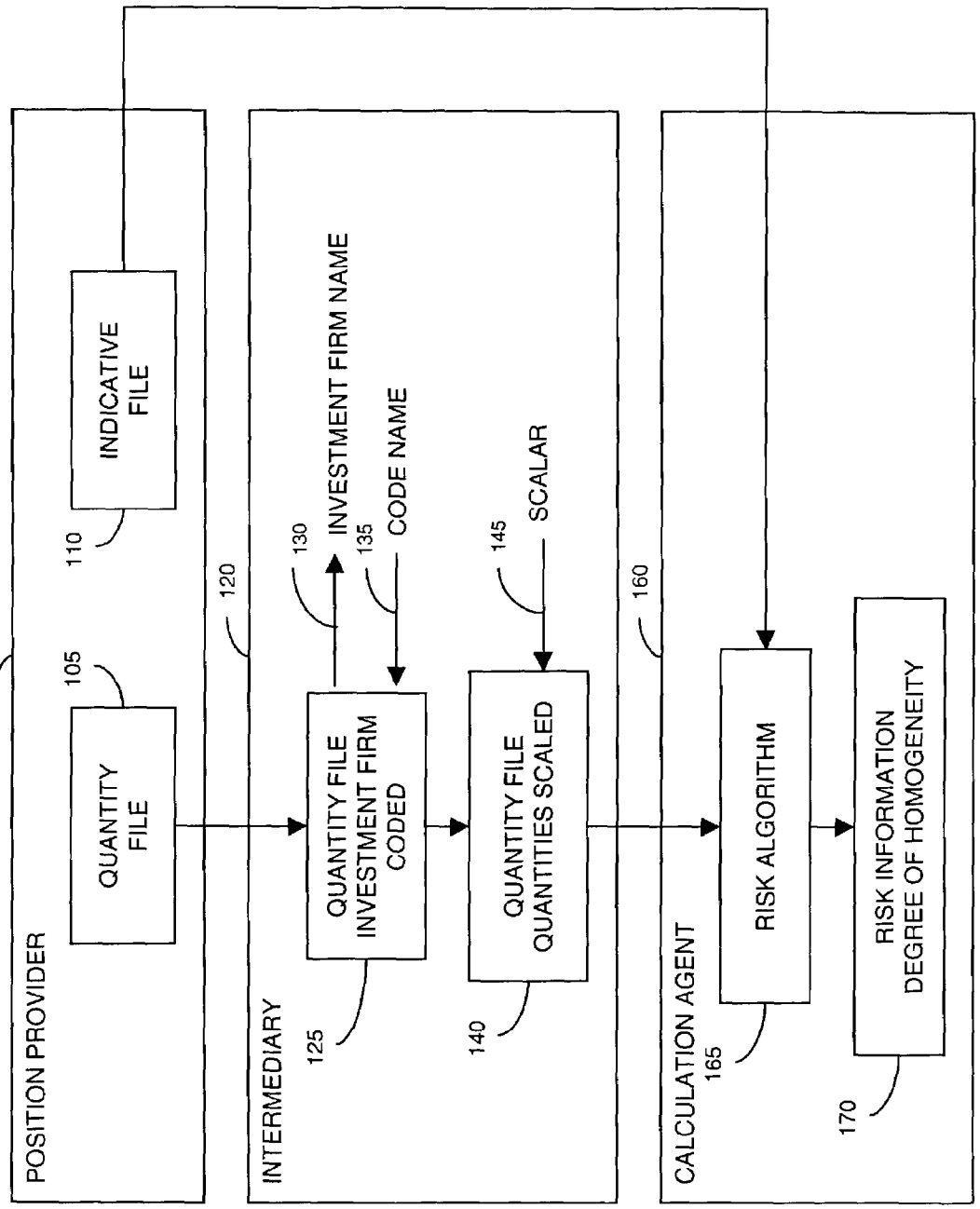
FIG. 1 is a block diagram of the parties and their roles in the process of delivering the position information to the Calculation Agent under one exemplary embodiment of the invention.

U.S. Provisional Patent Application No. 60/384,259, filed May 29, 2002, and U.S. Provisional Patent Application No. 60/385,800, filed Jun. 4, 2002, are incorporated by reference herein in their entireties.

Compared to the position information, the risk measures are relatively benign. They are descriptive, summary statistics that provide an indication of risk level, factor exposures and trading style, but present little information that can threaten the Investment Firm's business. The ideal solution would be to provide a method for doing independent risk computations without ever revealing the position information to any source.

I provide a method that allows the clients and others to use the Investment Firm's position information in performing risk calculations without the positions themselves being revealed. In one exemplary embodiment, the position information is separated into two parts. One part contains the public component of the position information, such as the security names. The second part contains the private component of the position information, such as the quantity of each security being held and the name of the firm that is holding the positions. The private information is coded by the intermediaries. The firm's name is replaced with a codename and the position quantities are each multiplied by a scalar. The intermediaries hold the code mapping and the multiplicative scalar in confidence. This file is then passed to the Calculation Agent, who also receives the public file. The Calculation Agent performs risk computations on the encoded positions, with each risk computation being a homogeneous function. The resulting risk analysis is sent back to one intermediary, who takes advantage of the homogeneity property to apply the inverse of the function using the multiplicative scalar to obtain the correct scale of the risk measures. The other intermediary then restores the firm name. The resulting risk information is then transmitted to the Investment Firm and its clients. In this process the underlying position information is never open to scrutiny. The various intermediaries know the position sizes or the name of the Investment Firm, but not the security names. The Calculation Agent knows the security names, but not the position sizes or the name of the Investment Firm.

The exemplary embodiments described herein allow the position information to be revealed for the purpose of computing and reporting risk information, while maintaining its security by preventing any outside party from knowing more than one of the three components of the Investment Firm's positions. In some embodiments, this is done through a process of partial encryption, position perturbation or randomization and coding of the Investment Firm's name.

The process for protecting position information while providing risk analysis can be broken up into several parts. First, the positions are separated into several components, any one of which is insufficient to provide useful position information. Second, several of these components are encoded. In particular, the identity of the investment Firm's name is replaced with a code name (or identifier) and the position quantities are perturbed by multiplying each quantity by a scalar. Third, the position data with these encoded components are sent to the agent who performs the risk analysis. The results of the risk analysis are then sent to another party for decoding. This party, who does not have access to the coded position information that was used in the risk analysis, takes advantage of certain mathematical properties of the risk measures to apply a transformation to the measures generated in the risk analysis, and in doing so obtains the risk measures that would have been generated if the actual positions had been used in the risk analysis. Finally, the resulting analysis is then transmitted back to the Investment Firm and to others as directed by the Investment Firm.

Separating and Transmitting the Components of Security Positions

A full characterization of an Investment Firm's position can be expressed by three components: the name of the Investment Firm, the names of the securities that the Investment Firm holds, and the quantity of the position in each security. The names of the securities can be represented in a number of forms. For stocks, the ticker symbol is often sufficient to uniquely identify the security, for bonds the name of the issuing party, the maturity date and coupon are generally sufficient. There are other identifiers that are also often sufficient to provide the security name, including the CUSIP, an alpha-numeric identifier for US and Canadian companies set forward by the Committee on Uniform Securities Identification Procedure, and the SEDOL, a seven-digit identifier issued by the London Stock Exchange for a number of non-US securities. The security name and related identification information is generally referred to as the security or financial instrument's indicative information. The quantity of a security can be expressed in a number of ways, most commonly as the number of the security held, such as the number of shares or number of bonds, or in dollar terms by multiplying the number of the security held by the price of the security.

Knowledge of only two of these three components limits the potential damage from the position information being revealed, but even this partial position information may be damaging. For example, if an Investment Firm's position quantity and security names are known, but the name of the Investment Firm is not, it is still possible to execute a short squeeze against a particularly large short position. It does not matter that the person executing this position does not know the identity of the party on the other side of the trade. If the Investment Firm's name and the security names are both known, but the quantities are not known, one can still infer what stocks or market sectors the Investment Firm is in, and from this infer the nature of its strategy. Knowledge of the Investment Firm's name and position quantities without knowledge of the security names is a more limited economic threat. But even here, this information can provide an indication of whether the Investment Firm is highly invested or not, and whether it is biased to the long or short side of the market. However, if only the name of the Investment Firm, or only the positions being held, or only the quantities held are known, then generally information of economic value is not revealed.

Related to an Investment Firm's positions are its transactions. Position information presents a snapshot of the Investment Firm's holdings at a point of time. Transaction information presents a running ledger of purchases and sales. Like the position information, it will include the name of each security and the quantity purchased or sold. The position information will specify the time of the snapshot whereas the transaction information will specify the time of each individual transaction. From a given initial starting position, the positions at a later date can be determined by taking the positions as of the first date plus the sum result of all transactions between that date and the next position date. Thus the position can be thought of as the integral or summation of transactions over time. The descriptions in the patent summary, preferred embodiments and figures refer to positions. However, in all points the same methods and systems can be applied to transaction information.

Encoding Components of Position Information for Risk Analysis

The usual path of information for third-party risk analysis is for a Position Provider to pass the Investment Firm's positions to a Calculation Agent, who applies various algorithms to the position in order to generate risk measures, and who then passes these back to the Investment Firm and perhaps to others as designated by the Investment Firm. The Position Provider may be the Investment Firm itself, or one of its agents who has the position information, such as its Prime Broker or Offshore Administrator. The Calculation Agent is the agent responsible for performing the risk analysis based on a knowledge of the Investment Firm's positions. The Calculation Agent might be a third-party firm that specializes in risk and performance analysis, or it might be a role taken on by one of the Investment Firm's regulators, clients or creditors.

The encoding process involves adding one or more stages to this path of the position information. In one exemplary encoding process, the position information passes from the Position Provider through two intermediaries before reaching the Calculating Agent.

In the first step of the process, the Position Provider separates the position information into several components. For example, one first component may contain the position quantity information, a second component may contain the firm name, and a third component may contain the name of the positions and other indicative information. Each of these components is protected so that a given party can be provided access to one component without having access to the other. One method for doing this is to pass each of the components separately to the various parties. For example, transmitting each component in a separate file, and only sending a given party the file containing the component to which that party is allowed access. Another method is to pass all of the components of the positions to every party, but have the various components encrypted separately, with a given party having the key for only the component to which that party is allowed access.

In some embodiments, the component containing the firm name is passed to the First Intermediary, who replaces the Investment Firm's name with a code. This intermediary is a trusted third-party that keeps the association between codes and Investment Firms secret.

The component containing the position quantities is passed to a Second Intermediary. This intermediary multiplies each of the quantities by a randomly selected scalar of its choosing. The result is that recipients can no longer determine whether the positions are large or small in magnitude.

In general, the scalar can be varied from one Investment Firm to another, and from one batch of position data to another. On occasion, there might be a demand for an aggregate analysis of a number of Investment Firm positions. For example, a fund of funds manager, who allocates investment capital to a number of different funds, may want to assess the overall risk of the total fund of funds portfolio. To do so, all the positions across all of the Investment Firms in all of the funds can be run through the risk analysis simultaneously, in order to take into account the correlation and other statistical interactions between the various Investment Firms' portfolios. In such a case, the same scalar is applied to the position quantities for all of the Investment Firms.

The encoding process can use a vector of scalars rather than a single scalar. In this case, the result will be an N×K matrix where N is the length of the vector of quantities, and K is the number of separate scalars that are applied. A different column can be selected to be applied to the generation of each risk measure, with the column number relayed back to the intermediary for rescaling.

Performing Risk Analysis on the Encoded Positions

After the Second Intermediary has scaled the position quantities, it sends this component to the Calculation Agent. The Calculation Agent also receives the component of the positions containing the position names, either as a second file directly from the Position Provider, or else by way of the Second Intermediary, but with this component encrypted with only the Calculation Agent having the key.

The Calculation Agent will know the names of the securities being held, but not the actual position quantity or the name of the Investment Firm. The Calculation Agent performs the algorithms on this encoded position data.

Decoding the Risk Information Using the Property of Homogeneity of Functions

Once the calculations are completed, the risk information is returned to the intermediary who provided the position information to the Calculation Agent. Knowing the scalar that he applied to the position quantities and using a property of the common risk measures, the intermediary can convert the risk measures back to the appropriate scale for the actual position sizes. This property is that the common risk measures are homogeneous functions. That is, they have the property that multiplying all of the arguments of the function by a scalar changes the value of the function by a monotonic function of that scalar. For a homogeneous function F(), $F(\lambda V)=g(\lambda)F(V)$, where V is a vector of the arguments, $\lambda>0$ is any scalar, and g() is some strictly increasing positive function. The standard risk measures are all homogenous of degree zero, one or two, so $g(\lambda)=\lambda^X$, where X signifies the degree of homogeneity. This means that once the risk measures are calculated based on the perturbed position quantity, the true risk values can be recovered through a transform based on the homogeneity of each risk measure. In the case of risk measures that have some degree of homogeneity, that is, where $g(\lambda)=\lambda^X$, this can be done by multiplying this measure by the inverse of the randomizing scalar, raised to the appropriate degree of homogeneity. And more generally, so long as the measure is generated using a homogeneous function, the actual value can be found by providing the scalar $\lambda$ and the function g().

For example, standard deviation is homogeneous of degree one in the position size. So if the Calculation Agent calculates the standard deviation of the Investment Firm's position as $12.5 and the scalar term that has been applied to the original data was 0.01, then the intermediary can recover the actual standard deviation as $12.5×100, or $1250. Percent return is homogeneous of degree zero. So if the return calculated by the Calculation Agent based on the perturbed exposures is 0.12, the intermediary will then report the return for the actual exposure as 0.12 as well. The variance of the dollar return is homogeneous of degree two in the position size. So if the variance calculated based on the randomized positions is 5, then intermediary will recover the variance of the actual position as $5\times100^2$, or 50,000. The general relationship between risk measures and the degree of homogeneity is that measures that are unitless, such as the rate of return or measures that are based on percent return, are homogeneous of degree zero; those that are dollar based, such as dollar exposure per sector are homogeneous of degree one; and measures that are variance-based are homogeneous of degree two. The following are a few of the common risk and performance measures that are homogeneous of degree zero: percent return, the Sharpe Ratio (a performance statistic that measures return per unit risk), vega (the impact of a one percent change in the volatility of the security or portfolio), and delta (the change in an option position per unit change in the value of the underlying security). The following are some of the common risk and performance measures that are homogeneous of degree one: DV01 (the dollar value of a one basis point change in interest rates), dollar turnover per day, the average number of days' trading volume represented by a given position size (a common measure of liquidity), dollar beta (the dollar exposure in the market index that yields the same market exposure) and the dollar exposure in a given market sector.

Homogeneous functions specify the scalar term $\lambda$ be greater than zero. For the purposes of this patent, this property can be further extended to permit the use of negative, but still non-zero, scalars. The attraction of including negative scalars is that then not only is it impossible for the Calculation Agent to discern the size of the position quantity, it is also impossible for the Calculation Agent to discern whether the position is being held long (i.e. with a positive quantity) or short (i.e. with a negative quantity). Some risk measures are reflexive with respect to sign, so that a negative scalar applied to the arguments of the function also scales the function itself by the negative amount. For example, if all the position quantities are multiplied by a negative scalar, the resulting dollar revenue from the position will be multiplied by that same negative scalar. If the position before showed a profit, it will now show a loss. Other measures are not reflexive, so if a negative scalar is applied to the exposure, the absolute value of that scalar is applied to the function. That is, in these cases $g(\lambda)=|\lambda|^X$, so $F(\lambda V)=|\lambda|^X F(V)$. The standard deviation and variance of positions are both examples of risk measures that are homogeneous, (of degree one and degree two, respectively), but are not reflexive. For these cases, if all the position quantities are multiplied by a negative scalar, the resulting risk measure is rescaled by the inverse of the absolute value of the scalar to recover the value of the risk measure for the original positions.

If the information provided by the Calculation Agent to the intermediaries includes not only the degree of homogeneity for each datum, but also a specification of whether the measure is reflexive or not reflexive, then the method can be extended to allow the use of negative as well as positive scalars in the randomization of the position quantities. More generally, the Calculation Agent can pass to the Second Intermediary a method for the inverse of g( ) for each datum.

While the above examples focus on $g(\lambda)=\lambda^X$ and $g(\lambda)=|\lambda|^X$, the encoding of the position information can be done with any function that can be inverted having the property of homogeneity. Additional security against the positions being revealed is to have the intermediary pass not only the position information, but also pass functions to be used by the calculation Agent in the risk evaluation calculation based on that position information. For example, suppose the intermediary passes a function for calculation, h( ), that yields the desired risk measure when composed with another function. That is, if the desired measure is m, then f°h=m. If f and h are selected to make f°h difficult to invert, then even if the agent discovers the rescaled value of the measure, he will not be able to use that and the risk measure he calculated to infer the scalar employed for the position quantities. The use of functions that are difficult to invert is at the core of many encryption methods. In some embodiments of the invention, this information can be passed as a method with each datum.

Transmitting the Decoded Risk Information to the Investment Firm

Once the risk information has been decoded by the Second Intermediary and the name of the Investment Firm has been returned by the First Intermediary, the First Intermediary can send the risk information to the firm and to others that the Investment Firm authorizes as recipients of the risk information. The report recipients may include the Investment Firm itself, current or perspective clients and investors in the Investment Firm, and regulators of the Investment Firm. Other possible recipients may include counterparties such as banks that finance investment positions or others who have entered into security-related contracts, such as swaps and over-the-counter options, with the Investment Firm. It may be desirable to present the risk information in a final reporting format, for example setting the risk information into tables and charts. This can be done by the intermediary before the information is transmitted. Alternatively, the intermediary can pass the decoded risk information to a Reporting Agent who can do the report formatting and the final transmission to the Investment Firm.

The Reporting Agent may be directed in terms of report format and mode of transmission by the Investment Firm or by the Calculation Agent. The activity of the Report Agent, and indeed the final decoded risk information, should be separate from the Calculation Agent. The Calculation Agent and the Reporting Agent might be part of the same firm, but housed in different areas with administrative barriers between the two, or they may be separate firms. The reason for this separation is that if a party knows both the risk measures calculated by the agent and the resealed risk measures reported by the intermediary, it is possible to solve for the scalar that was applied to the position quantities. With knowledge of this scalar, the Calculation Agent can solve for the actual positions of the Investment Firm.

Some risk measures are sufficiently descriptive that they reveal position information. A trivial example of this is a listing of the largest positions. Such measures, even if unauthorized, can be calculated by the Calculation Agent with the position information it has received. However, even if there are not sufficient controls on the agent to prevent the agent from generating unauthorized measures using the position data he receives, the results can be filtered out before they are of any use. Since the report is only decoded once it is back to an intermediary, if any measures are calculated which were unauthorized, these can be detected and deleted before they are decoded and transmitted back to the Investment Firm and other recipients.

Occasionally, position information is preprocessed to provide essential factor information. One common set of factors that can be provided for each position are the market and sector exposures, also known as the market and sector betas. Since generally each security will have a different exposure to the market and the sector, these values can be used to solve backward for the positions themselves. In this case, the problem is the same, and the procedure outlined above can be used to provide these factor exposures to the agent doing the risk calculations. A further level of randomization can be employed when statistically based factors are used rather than the positions themselves. Since the factors are estimated using statistical methods, they are measured with error. A slight variation (perturbation) in their value will have no significant effect on the resulting risk so long as this variation is unbiased across the factors and is small relative to their estimation error. However, these variations will make it difficult to work backwards from the factor values to determine the underlying securities and thereby determine the name of the underlying securities. The analysis in this case would be done based on the factor values. The randomization in aggregate will have a statistically insignificant impact on the risk results relative to what would have been computed using the actual factor estimates.

For example, the estimate of the market beta for IBM might be 1.2 and the estimate of the sector beta of IBM to the Technology sector might be 1.55. If the method for deriving these estimates in known, then one is likely to be able to determine that these factors relate to IBM by following this estimation method for all listed stocks and seeing which stock has these same values. Typically the standard deviation of the beta or other factor estimates is on the order of a half to a fifth of the estimate's value. So the addition of a zero mean error term to the beta with a standard deviation of just a twentieth its value will not be statistically significant. But many stocks will fall in that range of beta values, so it could not be determined with certainty that the security described by those betas is IBM.

Random perturbations can be applied directly to the position quantities as well. Many assets are typically traded in quantum lot sizes. For example, stocks are usually traded in lots of 100, with rounded units occurring more frequently than others. Quantities of 500 shares, 1000 shares or 10,000 shares will occur more often than quantities like 700 shares or 9500 shares. Taking advantage of these sorts of distributional characteristics of asset quantities, with sufficient data one could try to solve to see what scalar, when multiplied by this distribution of units of 100, would have led to the resulting coded value. In some cases, the scalar, or at least a set of possible scalars, may be able to be inferred from this exercise. If the encoded quantities are perturbed after coding, or if in addition the encoded results are rounded to a limited number of significant digits, this possibility may be eliminated.

Depending on the capabilities of the Investment Firm and the other parties and the level of security the Investment Firm demands for the position information, various parts of the information path can be combined. For example, the roles of the First Intermediary and the Second Intermediary can be combined into one intermediary, with that intermediary both coding the identity of the Investment Firm and applying the perturbation to the position quantities. This simplification of the process, which is shown in the first exemplary embodiment, will lead the one intermediary to know both the identity of the Investment Firm and the actual quantities of the securities held, but the intermediary will still not know the names of the securities to which these quantities refer. As another example, the Investment Firm can take the role of the Reporting Agent. Doing so eliminates one more link in the information path and increases position security.

Alternatively, the Position Provider can act as an intermediary in the role of one or both of the intermediaries. So long as the Position Provider services a number of Investment Firms (as would be the case if the Position Provider is a Prime Broker or Offshore Administrator), or, in the case of the Investment Firm acting as the Position Provider, so long as the positions are transmitted using an network address that is not known to be from the Investment Fund, the anonymity of the Investments Firm will be preserved even though the Calculation Agent knows the source of the coded position information. (Note that when the Investment Firm acts as Position Provider and also performs the encoding itself and sends the encoded position information to the Calculation Agent using a network address that the Calculation Agent does not associate with the Investment Firm, no intermediary is required.) As yet another example of how the parties can be combined, the roles of the Calculation Agent and the Reporting Agent might be combined. When this is the case, it may be useful to take steps to reduce the risk of the Calculation Agent using the report results to solve for the scalar that the intermediary has applied to the positions, and use that knowledge to then solve for the actual positions. Steps for providing security against this are shown in Embodiment 3.

Each stage in the process can be modeled as the execution of a computer or a partition within a computer. For example, the Position Provider, the First Intermediary, the Second Intermediary, the Calculation Agent and the Report Generator all can be computers executing different parts of a computational process or algorithm. The Position Provider may be a computer that contains a database that holds and formats the set of investment positions. The steps of receiving the position information and encoding the identity of this computer may be executed by a second computer. The next step, of the Second Intermediary, of encoding the position quantities may be executed by yet a third computer, with the algorithm of the Calculation Agent algorithm then executed by a fourth computer. These results may then be passed back down the line for each step of the decryption.

DETAILED DESCRIPTION

Description of the First embodiment

Referring to FIG. 1, this embodiment employs one intermediary 120 to act in the roles of encoding and decoding the quantity file 105 and in securing the identity of the Investment Firm. The Position Provider 100 formats the position data in two files, the Quantity File 105 and the Indicative File 110. Each file may have a file identifier file_id, a number that provides a common index between the two files and is unique to those files, so that if a set of files is sent, the quantity and indicative file for each fund position can be paired up.

The first file contains quantity information for each portfolio manager in the Investment Firm. This is the information that is not public. The daily information may also contain other non-public information, such as the total profit or loss and the capital allocation for the trader. For every asset there is a references via the internal_id to the asset held and the quantity information. Each asset on each day may have a unique internal_id number.

This is an example of a Quantity File in XML format:

```
<firm name="Standard Investment Firm">
    <filelink_id>datarun1</filelink_id>
    <manager name="John Smith">
        <day date="20020404">
            <total profit and loss>1004543.48</ total profit and loss>
            <capital allocation>25000000</ capital allocation>
            <asset internal_id=22344>
                <quantity count="200">
            </asset>
            <asset internal_id=44355>
                <quantity count="50">
            </asset>
        </day>
    </manager>
</firm>
```

The second file holds the publicly available asset information. Assets are identified by their internal-id and an extensible list of alternative identifiers such as ticker symbol, CUSIP or SEDOL. This embodiment is illustrated for stock positions, where ticker symbols, CUSIPs and SEDOLs are sufficient information for security identification. The method can be generalized to any set of securities, derivatives or other financial instruments where the description might be more involved. Additional information, such as an assigned sector and industry, prices, price changes and currency in which the security is denominated, along with the date associated with these market values, may also be provided in this file. The Indicative File does not have the fund name or manager name, or other information that could be used to identify the fund.

This is an example of an Indicative File in XML format:

```
<assets>
    <filelink_id>datarun1</filelink_id>
    <asset internal_id=22344>
        <symbol>
            <exchange>NYSE</exchange>
            <ticker>F</ticker>
        </symbol>
        <sedol>123456</sedol>
        <country>USA</country>
        <cusip>abc</cusip>
        <sector>Technology</sector>
        <industry>Internet</industry>
        <prices>
            <price date="20020404">
                <currency>USD</currency>
                <value>89.4</value>
                <change>1.34</change>
            </price>
        </prices>
    </asset>
</assets>
```

The Indicative File 110 is sent directly to the Calculation Agent 160 by a secure socket, so this information is not known to the Intermediary 120. The Quantity File 105 is sent by a secure socket to the Intermediary 120 for encoding.

Once the Intermediary 120 receives the Quantity File 105, it replaces the Investment Firm name 130 with a code name 135 and multiplies all the quantities by a scalar 145. The Intermediary holds the fund name/code name mapping and the scalar value in confidence. The Intermediary 120 then sends the Calculation Agent 160 the modified Quantity File 140. The Calculation Agent 160 combines the encoded information of the Quantity File 140 with the information of the Indicative File 110 to obtain a complete picture of the encoded positions. The Calculation Agent 160 then executes the risk analysis by applying a set of risk algorithms 165 to the encoded positions. The output of this analysis 170 will contain the various risk and performance measures that the Calculation Agent has computed using the encoded position data. The output may also contain the degree of homogeneity for each datum.

In a variation of the embodiment of FIG. 1 (not shown), the the Position Provider performs the functions of the intermediary 120 in FIG. 1. The Position Provider provides the scaled quantities file 140 and the indicative file 110 to the Calculation Agent. The Position Provider uses a network address that the Calculation Agent does not associate with the Investment Firm. The Position Provider 100A may be the Investment Firm itself, or one of its agents who has the position information, such as its Prime Broker or Offshore Administrator.

Figure 2:
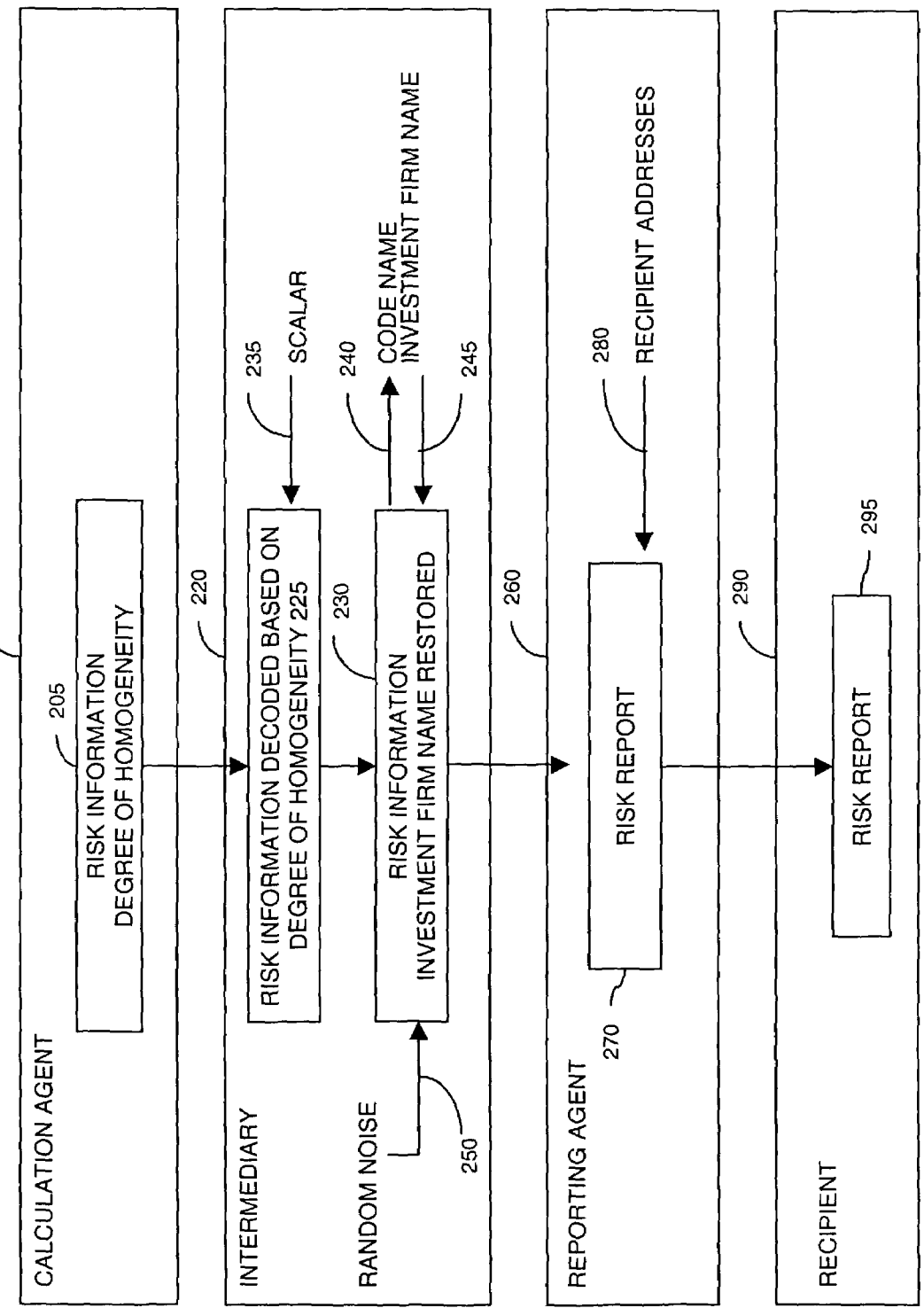
FIG. 2 is a block diagram of the parties and their roles in the process of delivering the Calculation Agent's analysis to the Investment Firm and other end-users under the embodiment of FIG. 1.

FIG. 2 presents the path of the risk analysis from the Calculation Agent to the recipients of the risk information. The Calculation Agent 200 sends the risk results and the degree of homogeneity 205 for each risk datum back to the Intermediary 220. The Intermediary replaces the code name 240 with the name of the Investment Firm 245. The Intermediary also decodes the risk data based on the scalar 235 that was used in the encoding process and also based on the degree of homogeneity of the risk measures, as presented in the file 205 from the Calculation Agent 200. In particular, the Intermediary applies the inverse of the scalar to reconstitute the correct scale for each risk measure based on the specified degree of homogeneity. That is, if the datum is homogeneous of degree n, then the datum is multiplied by $(1/\text{scalar})^n$.

In this embodiment, the Intermediary then also injects a random term 250 into the risk measures to perturb them slightly from the values they would have based simply on the scalar adjustment. The effect of this perturbation is to make it more difficult to work backwards from a decoded risk number to the encoded risk number and from there to the underlying positions. The transformed risk information is approximately equal to the risk information that would be generated if the Calculation Agent's algorithm had been applied directly to the actual positions. The decoded and perturbed risk results 230 are then sent to the Reporting Agent 260 to have the report 270 generated and transmitted to the various recipients. To deliver the reports, the Reporting Agent employs a delivery means based on a list 280 containing the addresses of the recipients 290.

To ensure security of the position data, those who have access to the encoded position data do not also have access, directly or indirectly, to the scalar 235 used to transform the original position data. Since the scalar can be calculated by comparing the risk information before its decoding 205 and after its decoding 225, the report generation function performed by the Reporting Agent 260 is done at arm's length from the analysis function performed by the Calculation Agent 200. There are many organizational and operational means of creating this arm's length relationship. The report generation could, for example, merely be done by a different group within the Calculation Agent firm, possibly by a group in a different location. Alternatively, either the analysis function or report generation function could be outsourced to a third party. The approach that any Calculation Agent uses to create the arm's length relationship will be largely driven by the marketing importance they ascribe to that independence.

Description of the Embodiment 2

In some cases there may be an advantage for one of the Intermediaries to have access to the security description. This might be the case if, for example, the intermediary is also providing the Calculation Agent with market data related to the securities the Calculation Agent will be analyzing. An alternative encryption process employing the same method can facilitate this.

Figure 3:
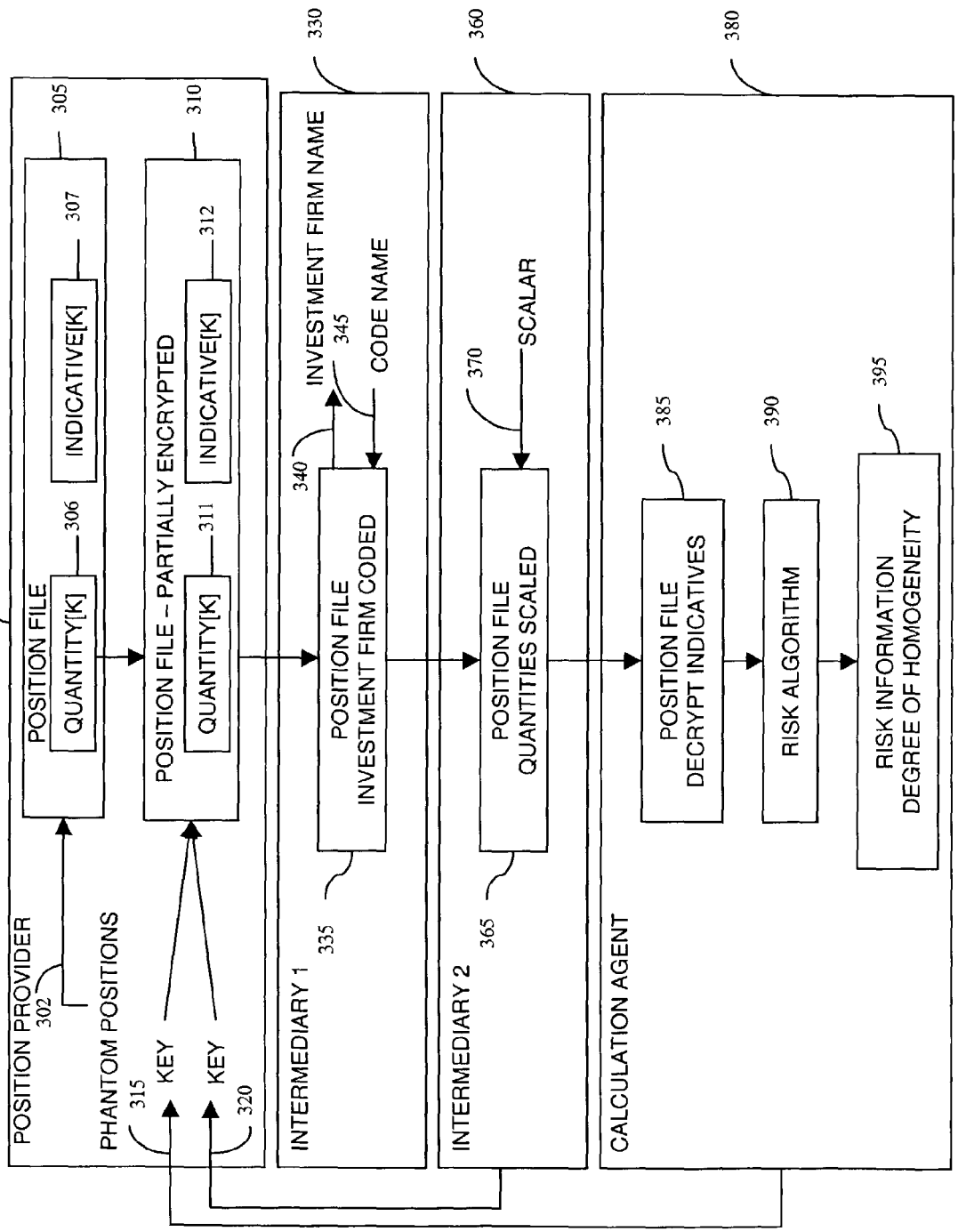
FIG. 3 is a block diagram of the path of the position or transaction information from the Investment Firm to the Calculation Agent under a second exemplary embodiment of the invention.

Referring to FIG. 3, the Calculation Agent 380 provides an encryption key 315 to the Position Provider 300. The Second Intermediary 360 provides a separate encryption key 320 to the Position Provider 300. The Position Provider indexes the indicative information 307 and quantity information 306 for each security position with an index scheme of his choosing, so long as the index for each security is unique. In the case of equity positions, if the ticker symbol is used as the indicative, a file containing positions in IBM, General Motors, Citigroup and Microsoft, having ticker symbols of IBM, GE, C and MSFT, respectively, might be formatted in comma-delimited form, with ticker symbol, index, quantity index, as follows:

IBM,1,5500,1
GE,2,2500,2
C,3,6000,3
MSFT,4,3000,4

Where the respective quantities, measured in number of shares held, are 5500, 2500, 6000 and 3000.

The Position Provider then adds an arbitrary number of phantom positions 302 to the position file 305 in which the Investment Firm has no exposure. By increasing the number of these phantom positions, the level of position information that can be divined from the encrypted file can be made arbitrarily low. The Position Provider then encrypts the index associated with the indicative information using the key provided by the Calculation Agent, and encrypts the index associated with the quantity using the key provided by the Second Intermediary 360. Adding the encryption and a number of phantom positions, in this case for Ford (ticker symbol F), Cisco (ticker symbol CSCO) and AOL Time Warner (ticker symbol AOL), the file will have the following form:

IBM,223677,5500,9866554
GE,544456,2500,765223
C,2345643,6000,8997605
MSFT,21269878,3000,3457765
F,5455432,0,345675
CSCO,6324569,0,54443236
AOL,23456757,0,434457

The encrypted files containing the indicative information 312 and quantity information 311 may then be shuffled along with their respective indexes, so that the various quantities cannot be associated with their ticker symbol, leading to a file such as the following:

GE,544456, 5500,9866554
CSCO,6324569,2500,765223
IBM,223677,6000,8997605
AOL,23456757,3000,3457765
MSFT,21269878,0,345675
F,5455432,0,54443236
C,2345643,0,434457

The ticker symbols and any other indicative information and the quantities are also encrypted using the key 320 provided by the Second Intermediary 360. This final encryption step is not described in detail in the example provided above in order to make the other steps clearer.

This file is sent by the Position Provider 300 along with the Investment Firm name or identifier to the First Intermediary 330. The First Intermediary 330 replaces the Investment Firm name 340 with a code name 345. Since the ticker symbols and quantities are encrypted, the First Intermediary 330 will have no information of the securities or the quantities that the Investment Firm holds.

The First Intermediary 330 then sends the position information 335 on to the Second Intermediary 360. The Second Intermediary 360 decrypts the ticker symbols, the quantity information and the index associated with the ticker symbol. The intermediary then applies a scalar transformation 370 to each quantity, maintaining the scalar that it used in confidence. The Second Intermediary 360 may also take the ticker symbols or other indicative information to provide market data for the Calculation Agent. Along with providing data for the actual positions held by the Investment Firm, the Second Intermediary 360 will provide data for a number of phantom positions. However, generally the incremental cost for providing this added information is small. The Second Intermediary 360 knows the position quantities and to some extent has information on the securities held. However, the intermediary does not know what quantities go with which positions, and furthermore, does not know which securities positions are real and which are phantom positions.

Once the Calculation Agent 380 receives the file 365 from the Second Intermediary 360, the Calculation Agent decrypts the index associated with the position quantities 385, and can then match each stock ticker symbol with the appropriate quantity, where that quantity has been encoded by the Second Intermediary 360. The Calculation Agent applies the algorithms 390 to this position information in order to produce the risk information, providing for each risk datum that datum's degree of homogeneity 395.

Figure 4:
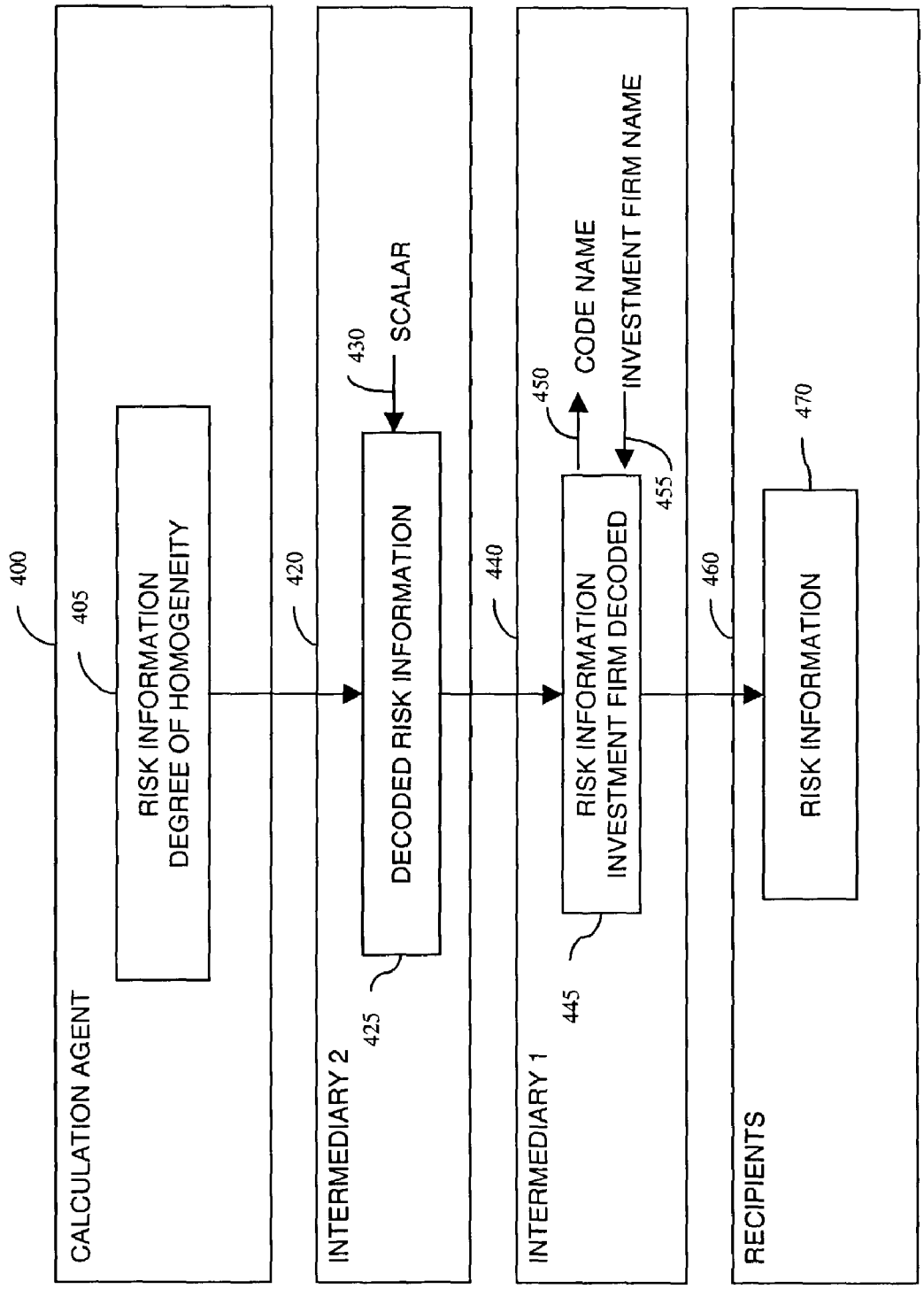
FIG. 4 is a block diagram of the path of the analysis from the Calculation Agent to the point of its delivery to the Investment Firm and other end-users under the embodiment of FIG. 3.

The path of the risk information back to the recipients is shown in FIG. 4. The Calculation Agent 400 sends the risk information along with the degree of homogeneity for each datum 405 to the Second Intermediary 420. The Second Intermediary 420 employs the scalar 430 it has stored to apply the inverse based on the degree of homogeneity in order to recover the risk information 425 that would have been obtained had the Calculation Agent 400 applied its algorithms to the actual position information. The information is then sent from the Second Intermediary 420 to the First Intermediary 440. The First Intermediary 440 replaces the code name 450 with the Investment Firm name 455 and passes the information 445 on to the recipients 460. A Reporting Agent may be added to the information delivery path between the point of Intermediary 440 and the final risk information recipients, as described above with reference to Embodiment 1.

Description of the Embodiment 3

In some cases, there may be an advantage for the Calculation Agent and the Reporting Agent to function in close proximity. This may be the case when the method of report generation is closely tied to the nature of the risk information being generated, or when the reporting format is a core feature of the services provided by the Calculation Agent. If the Calculation Agent who holds the positions also has access to the report after the results have been decoded by the intermediary, then the Calculation Agent can work backwards from the report results to solve for the scalar that the intermediary employed, and using that scalar can solve for the actual positions. However, note that even in this case the Calculation Agent still need not know the identity of the Investment Firm, since this last component of the position information can be added before the report delivery by the First Intermediary.

The level of information held by the Calculation Agent in the case when the Calculation Agent is also acting as or in concert with the Reporting Agent can be made arbitrarily low by flooding the Calculation Agent with phantom positions in a manner similar to the use of phantom positions in Embodiment 2.

Figure 5:
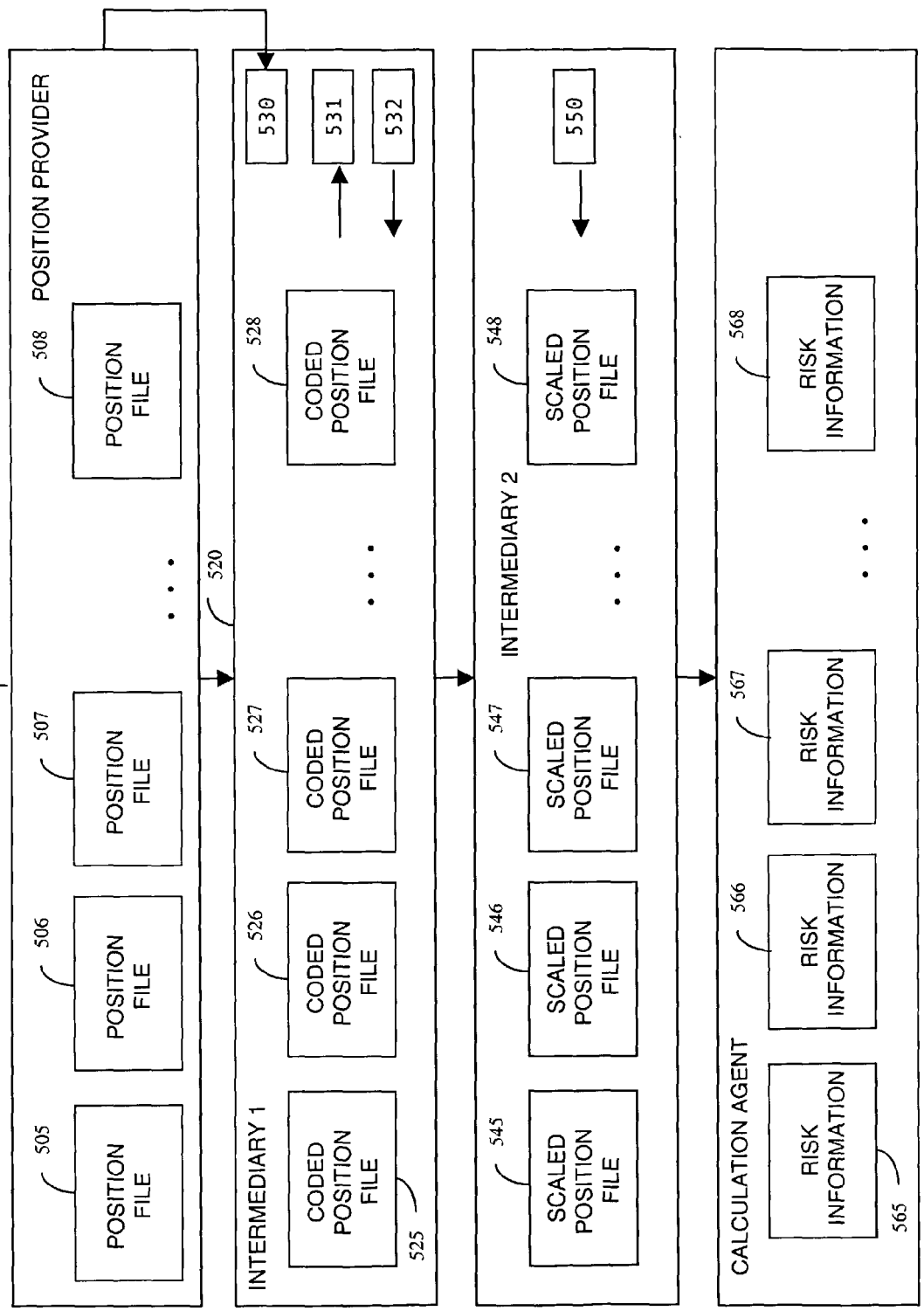
FIG. 5 is a block diagram of the path of position data form the Position Provider to the Calculation Agent when multiple position files are employed as a means of protecting the position information.

Referring to FIG. 5, the Position Provider 500 sends a number of files 505-508 to the Calculation Agent 560 through the path of the First Intermediary 520 and the Second Intermediary 540. These two intermediaries perform the same functions as in Embodiment 2. The First Intermediary 520 replaces the Investment Firm name 531 with a code name 532, and the Second Intermediary 540 perturbs the positions quantities with a scalar 550. Of the files that are sent to the First Intermediary 520 and then on to the Calculation Agent, only one contains the actual positions of the Investment Firm. The others are phantom files that contain positions that are not representative of the positions held by the Investment Firm. The Position Provider 500 also indicates to the First Intermediary 520 which of the position files represents the actual positions of the Investment Firm. The First Intermediary 520 keeps this information 530, as well as the mapping between the Investment Firm name and the code name, in confidence. The Calculation Agent 560 produces risk information 565-568 for each of these position files.

Figure 6:
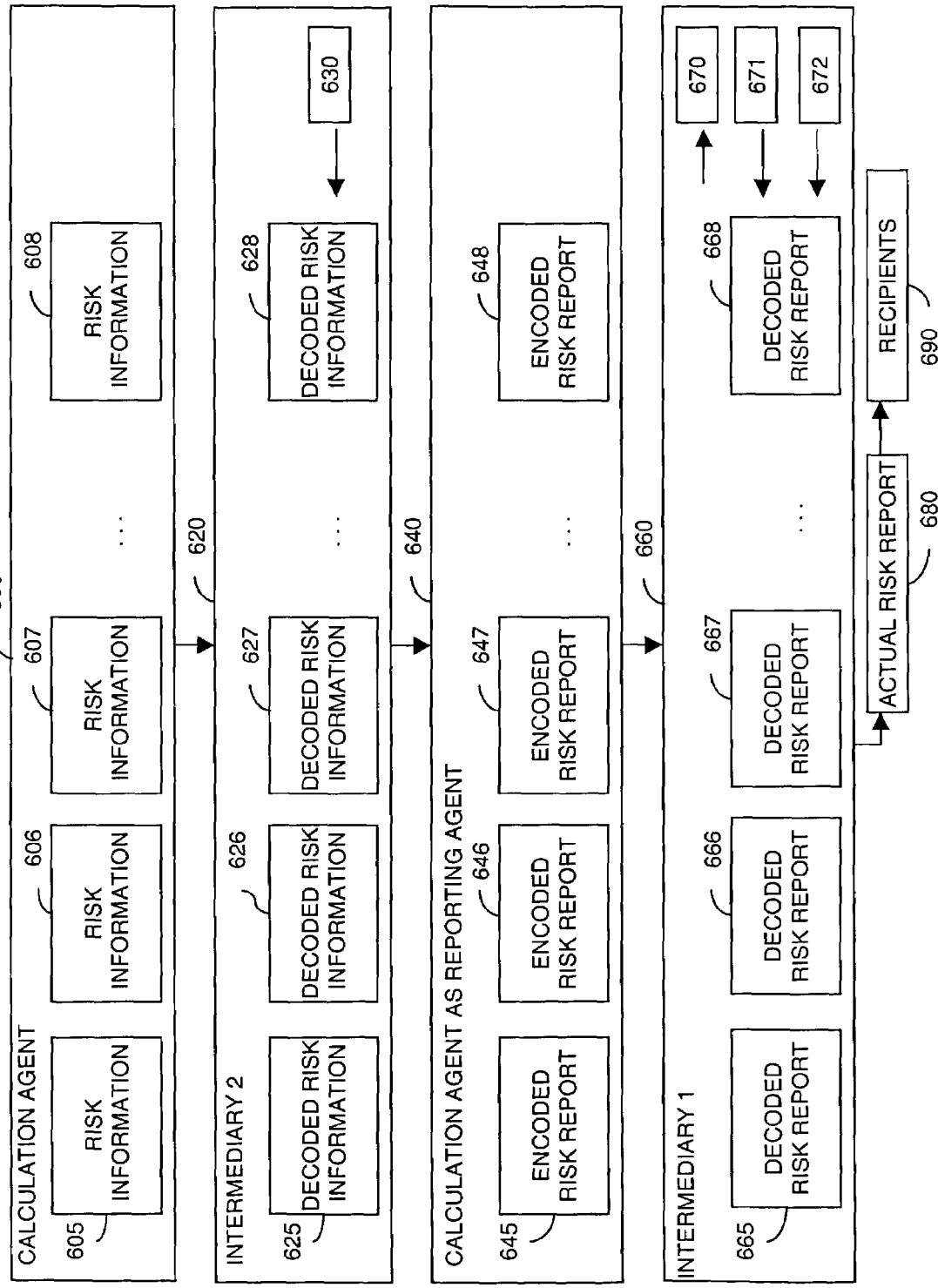
FIG. 6 is a block diagram of the path of the position data from the Calculation Agent to the risk report recipients when multiple files are employed as a means of protecting position the information.

The path of these results back to the report recipients is shown in FIG. 6. The Calculation Agent 600 passes the risk information for each set of position data 605-608 back to the Second Intermediary 620. The Second Intermediary 620 applies the scalar 630 to decode the risk information for each set of risk information. The decoded results 625-628 are then passed on to the Calculation Agent who is acting as the Reporting Agent 640.

In this embodiment, at this point there is some risk that the Calculation Agent 600 will be able to observe the report results, and from these results work backwards to determine the actual position information. However, by increasing the number of phantom reports that are sent along with the actual report, the ratio of information to "noise" can be made arbitrarily low. For example, if the Position Provider transmits twenty position files, with only one of them being the correct positions, there is only a five percent chance that the Calculation Agent will select the actual positions. Thus, enough phantom positions or phantom transactions can be included to reduce the probability of the Calculation Agent identifying the original position or transaction information to a predetermined acceptable level. At this level, the value of the position information is of little use, especially since the Calculation Agent does not know the Investment Firm to which the position information relates. This method will increase the computational time in proportion with the number of phantom reports that are generated. With the exception of some Monte Carlo methods and numerical integration techniques that are employed for derivative instruments, risk and performance algorithms generally take little computational time, so this increase in time will not be significant.

The reports are sent to the First Intermediary 660, who replaces the code name 670 on the reports with the Investment Firm name 671. The First Intermediary 660 then uses the information provided by the Position Provider 672 to discard the reports based on the phantom position files, and sends the report based on the real positions 680 on to the various recipients 690.

Some embodiments of the present invention are embodied in the form of computer-implemented processes and apparatus for practicing those processes. Other embodiments of the invention are embodied in the form of computer program code embodied in tangible media—such as random access memory (RAM), floppy diskettes, read only memories (ROMs), CD-ROMs, DVD-ROMs, hard drives, high density (e.g., "ZIP™" or "JAZZ™") removable disks, or any other computer-readable storage medium—such that, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for concealing investment position or transaction information during risk or performance evaluation, comprising the steps of:
    (a) providing investment position or transaction information defining a set of investment positions or transactions of an investment firm, the investment position or transaction information including a security type and investment position or transaction quantities;
    (b) encoding the investment position or transaction quantities by multiplying them by a scalar, thereby concealing the investment position or transaction quantities from a calculation agent that performs risk or performance evaluation using the encoded investment position or transaction quantities as input to an algorithm;
    (c) transmitting electrical signals representing the security type and encoded investment position or transaction information to the calculation agent that performs risk or performance evaluation using the encoded investment position or transaction quantities, the calculation agent generating risk or performance information;
    (d) receiving electrical signals representing the risk or performance information from the calculation agent that performs risk or performance evaluation, the risk or performance information including:
        at least one risk or performance measure generated by the calculation agent using the security type and the encoded investment position information, wherein each risk or performance measure is a homogeneous function, and
        a respective degree of homogeneity of each risk or performance measure in the risk or performance information;
    (e) applying a transform to the risk or performance information generated by the calculation agent, wherein the transform is based on the respective degree of homogeneity of each risk or performance measure in the risk or performance information generated by the calculation agent, thereby obtaining transformed risk or performance information that is approximately equal to risk or performance information that would be generated if the algorithm is applied to the position or transaction quantities provided in step (a);
    (f) storing the transformed risk or performance information in a computer readable storage medium, and
    (g) transmitting a report of the transformed risk or performance information to one or more recipients, the transmitting being performed by the investment firm.

2. The method of claim 1, wherein step (c) includes transmitting the encoded position information from a network address that is not known to the calculation agent as being associated with the investment firm.

3. The method of claim 1, further comprising transmitting a report of the transformed risk or performance information to one or more recipients, the transmitting being performed by the calculation agent.

4. The method of claim 3, further comprising adding a plurality of phantom positions or phantom transactions to the encoded position or transaction information before step (c).

5. The method of claim 1, wherein position or transaction quantities are encoded by multiplying a vector of the position or transaction quantities by a vector of scalars.

6. The method in claim 1, wherein step (b) includes encoding the position or transaction quantities by applying a mathematical transformation that can be inverted based on a degree of homogeneity of a risk function that is applied to the position quantities by the calculation agent.

7. The method of claim 1, wherein step (b) includes injecting random or pseudorandom noise into statistics derived from the position or transaction quantities.

8. The method of claim 1, wherein step (b) is performed by a single intermediary, and includes encoding an identity of the investment firm and perturbing the position or transaction quantities.

9. The method of claim 1, wherein steps (a) though (c) are performed by the investment firm, and includes encoding an identity of the investment firm and perturbing the position or transaction quantities.

10. The method of claim 1, further comprising adding one or more phantom positions or phantom transactions to the encoded position or transaction information before step (c).

11. The method of claim 1, further comprising shuffling position or transaction quantities associated with at least two of the positions or transactions, along with respective indices thereof, before step (c).

12. A method for concealing investment position information during risk or performance evaluation, comprising the steps of:
    (a) receiving investment position information defining a set of investment positions or transactions from an investment firm, the investment position information including a security type and investment position or transaction quantities;
    (b) encoding the position or transaction quantities by multiplying them by a scalar, thereby concealing the identity of the investment firm and the position or transaction quantities of the investment positions or transactions from a calculation agent that performs risk or performance evaluation on the encoded position or transaction information, the calculation agent generating risk or performance information; and (c) transmitting electrical signals representing the security type and the encoded position or transaction information to the calculation agent that performs risk or performance evaluation;

(d) receiving electrical signals representing risk or performance information generated by the calculation agent that performs risk or performance evaluation using the encoded position or transaction information as input to an algorithm, including:

at least one risk or performance measure generated by the calculation agent using the security type and the encoded investment position information, wherein each risk or performance measure is a homogeneous function, and a respective degree of homogeneity of each risk or performance measure in the risk or performance information; and (e) applying a transform to the risk or performance information generated by the calculation agent, so that the transformed risk or performance information is approximately equal to risk or performance information that would be generated if the algorithm is applied to the position or transaction quantities provided in step (a), wherein the transform is based on a respective degree of homogeneity of each risk or performance measure in the risk or performance information generated by the calculation agent;

(f) storing the transformed risk or performance information in a computer readable storage medium, and (g) transmitting a report of the transformed risk or performance information to one or more recipients, the transmitting being performed by the investment firm.

13. The method of claim 12, further comprising:
decoding risk or performance information generated by the calculation agent based on the encoded position information; and providing the position information and decoded risk or performance information generated by the calculation agent to a recipient.

14. The method of claim 13, wherein the recipient is at least one of the group consisting of the investment firm, a client of the investment firm, and a regulator of the investment firm.

15. The method of claim 12, wherein the investment firm encrypts position or transaction quantities and position or transaction names identifying investment vehicles before step (a).

16. The method of claim 15, wherein the investment firm encrypts the position or transaction quantities and position or transaction names using two different encryption keys, encryption algorithms or secure sockets.

17. The method of claim 16, wherein step (b) includes:
encoding the identity of the investment firm by a first intermediary; and forwarding the encoded identity and the encrypted position or transaction quantities and encrypted position or transaction names to a second intermediary, wherein the second intermediary decrypts the position or transaction quantities and encodes the position or transaction quantities, and forwards the encoded investment firm identity and encoded position or transaction quantities and the encrypted position or transaction names to the calculation agent.

18. The method of claim 17, wherein the second intermediary provides the calculation agent with a function to be used in the risk or performance evaluation by the calculation agent.

19. The method of claim 17, wherein the second intermediary decrypts the position or transaction quantities using a key or secure socket corresponding to the first encryption key, encryption algorithm or secure socket used by the investment firm, and the calculation agent decrypts the position or transaction names using a key or secure socket corresponding to the second encryption key, encryption algorithm or secure socket used by the investment firm.

20. The method of claim 17, wherein the position or transaction names and position or transaction quantities are concealed from the first intermediary, and the position or transaction names and the identity of the investment firm are concealed from the second intermediary.

21. The method of claim 12, wherein the scalar is a positive or negative non-zero number.

22. The method of claim 12, wherein position or transaction quantities are encoded by multiplying a vector of the position or transaction quantities by a vector of scalars.

23. The method in claim 12, wherein step (b) includes encoding the position or transaction quantities by applying a mathematical transformation that can be inverted based on a degree of homogeneity of a risk function that is applied to the position quantities by the calculation agent.

24. The method of claim 12, wherein step (b) includes injecting random or pseudorandom noise into statistics derived from the position or transaction quantities.

25. The method of claim 12, wherein step (b) includes:
transforming the position or transaction quantities using a transform that is concealed from the calculation agent; and encoding the identity of the investment firm; and transmitting the position names, transformed position or transaction quantities and encoded investment firm identity to the calculation agent.

26. The method of claim 12, wherein:
step (a) includes receiving the information in two separate files or messages, the first file or message including the identity of the investment firm and the position or transaction quantities, the second file or message including position or transaction names identifying investment vehicles.

27. The method of claim 26, wherein the first file or message and the second file or message each have a first common index, and entries within the first file or message and entries within the second file or message each have a second common index, allowing the calculation agent to determine which encoded position or transaction quantity corresponds to each respective position name in the second file or message.

28. The method of claim 12, wherein:
step (a) includes receiving a first file or message including the identity of the investment firm and the position or transaction quantities, and a second file or message including position or transaction names identifying investment vehicles is sent directly to the calculation agent by the investment firm.

29. The method of claim 12, further comprising adding a plurality of phantom positions or phantom transactions to the encoded position or transaction information before transmitting the encoded position or transaction information to the calculation agent.

30. A computer readable storage medium encoded with computer program code, wherein when the computer program code is executed by a processor, the processor performs a method for protecting investment position or transaction information during risk or performance evaluation, comprising the steps of:

(a) providing investment position or transaction information defining a set of investment positions or transactions of an investment firm, the investment position or transaction information including investment position or transaction quantities;

(b) encoding at least a portion of the investment position or transaction information, thereby_concealing the position or transaction quantities of the investment positions or transactions from a calculation agent that performs risk or performance evaluation on the encoded investment position or transaction information, wherein the encoding includes encoding the position or transaction quantities by applying a mathematical transformation that can be inverted based on a degree of homogeneity of a risk function that is applied to the position quantities by the calculation agent that performs risk or performance evaluation; and (c) transmitting the encoded position or transaction information to a computer readable storage medium of the calculation agent that performs risk or performance evaluation using the encoded investment position or transaction quantities, the calculation agent generating risk or performance information;

(d) applying a transform to the risk or performance information generated by the calculation agent, wherein the transform is based on the respective degree of homogeneity of each risk or performance measure in the risk or performance information generated by the calculation agent, thereby obtaining transformed risk or performance information that is approximately equal to risk or performance information that would be generated if the algorithm is applied to the position or transaction quantities provided in step (a); and (e) transmitting a report of the transformed risk or performance information to one or more recipients, the transmitting being performed by the investment firm.

31. A method for concealing investment position or transaction information during risk or performance evaluation, comprising the steps of:

(a) providing, by a portfolio agent, investment position or transaction information defining a set of investment positions or transactions, the investment position or transaction information including an identification of a security type and an investment position or transaction quantity;

(b) encoding, by the portfolio agent, the position or transaction quantity by multiplying the position or transaction quantity by a constant or scalars thereby concealing the position or transaction information;

(c) transmitting the security type and the encoded position or transaction information to a calculation agent that performs risk or performance evaluation using the encoded investment position or transaction information, the transmitting being performed using inter-computer communications;

(d) using, by the calculation agent, the transmitted security type and the encoded position or transaction information as input to calculate a risk or performance measure that has a property of being a homogeneous function; and (d') providing, by the calculation agent to the portfolio agent, the risk or performance measure and a degree of homogeneity of the homogeneous function;

(e) applying, by the portfolio agent, an inversion of the risk or performance measure based on the degree of homogeneity of the risk or performance measure and also based on the constant or scalar used in step (b), thereby providing transformed risk or performance information that is approximately equal to risk or performance information that would be generated if the homogeneous function is applied to the position or transaction quantities provided in step (a);

(f) storing the transformed risk or performance information in a computer readable storage medium; and g) transmitting a report of the transformed risk or performance information to one or more recipients, the transmitting being performed by the investment firm.

* * * * *